ELECTRONIC COMMUTATORS

Filed March 15, 1956 3 Sheets-Sheet 1

INVENTOR
LEONARD R. HARPER
BY Edwin Lester
AGENT

Feb. 7, 1961 L. R. HARPER 2,971,157

ELECTRONIC COMMUTATORS

Filed March 15, 1956 3 Sheets-Sheet 2

Feb. 7, 1961

L. R. HARPER

ELECTRONIC COMMUTATORS 2,971,157

Filed March 15, 1956

3 Sheets-Sheet 3

United States Patent Office 2,971,157

Patented Feb. 7, 1961

2,971,157

ELECTRONIC COMMUTATORS

Leonard R. Harper, Poughkeepsie, N.Y., assignor to International Business Machines Corporation, New York, N.Y., a corporation of New York Filed Mar. 15, 1956, Ser. No. 571,652

6 Claims. (Cl. 328—42)

This invention relates to electronic commutators and, more particularly, to an improved ring circuit.

An electronic commutator may be comprised of a plurality of bi-stable devices, each having two stable states designated as the On and Off states, which are cascaded together to form a ring. Initially, only a predetermined one of the devices in the ring is the On state so that a pulse applied to the ring effectively causes the predetermined one of the devices to be switched to the Off state and the next succeeding device to be switched to the On state. In a similar manner, each succeeding pulse applied to the ring effectively causes the device that is presently in the On state to be switched to the off state and the next succeeding device to be switched to the On state so that the On state steps from device to device of the ring. The ring may or may not be closed, that is, the On state may proceed automatically from the last device in the ring to the first, or it may be that separate means are provided for turning On the first device in the ring.

One form of electronic commutator described in Patent 2,551,119 to Hadded et al., dated May 1, 1951, comprises a series of trigger circuits interconnected by coupling circuits in such a manner that the one trigger of the ring which is in the On state conditions the coupling device associated with the next succeeding trigger to respond to the next input pulse and initiate a switching of the next succeeding trigger to its On state. When the next succeeding trigger switches to its On state, it transfers a pulse back to the next lower trigger, that is, the one trigger of the ring which was previously in the On state, to switch it back to the Off state. At the same time, the next succeeding trigger now being in the On state conditions the succeeding coupling device to respond to the next succeeding pulse etc. This type of ring, while effective, is subject to a disadvantage in that instead of switching two triggers simultaneously it is necessary to switch one trigger with another trigger thereby slowing down the response of the ring.

Accordingly, an object of the present invention is to provide a novel ring type of electronic commutator.

Another object of the invention is the provision of a novel electronic ring circuit which can reliably operate at high speed.

Still another object of the invention is to provide a novel electronic ring arrangement whereby the switching operations are minimized.

A further object of the invention is the provision of a novel arrangement whereby a ring is stepped by simultaneously switching two bi-stable devices of the ring.

A still further object of the invention is to provide an electronic commutator comprising a series of commutation circuits cooperating in a novel manner.

A feature of the invention is an improved binary electronic commutation circuit, including a novel gating arrangement, which permits the circuit to rapidly switch its state in response to each input pulse.

In accordance with the present invention, a ring type of electronic commutator is provided comprised of a plurality of cascaded commutation circuits. Each commutation circuit includes a bi-stable device and gate means connected in such a manner as to permit binary operation of the commutation circuit. More specifically, the bi-stable device includes a pair of input terminals and a pair of output terminals while the gate means includes a first pair of control terminals, a second pair of control terminals, a common input terminal and a pair of output terminals. The output terminals of the gate means are connected to the input terminals of the bi-stable device while the output terminals of the bi-stable device are connected to the first pair of control terminals of the gate means. The second pair of control terminals of the gate means are used for external control purposes.

If the potentials at the second pair of control terminals are maintained at predetermined values by external means, then, the gate means may be self-controlled solely by its associated bi-stable device. Thus, under such conditions, when an input pulse is applied to the common input terminal, the gate means causes a pulse to be transmitted to switch the associated bi-stable device from one state to the opposite regardless of its previous state. For example, when the bi-stable device is in the Off state, if an input pulse is applied to the common input terminal, the gate means transmits a pulse to switch the bi-stable device to its On state. Likewise, when the bi-stable device is in the On state, if an input pulse is applied to the common input terminal, the gate means transmits a pulse to switch the bi-stable device to its Off state. When the next input pulse is applied to the common input terminal, the status of the bi-stable device so controls the gate means as to cause a pulse to be applied to switch the bi-stable device to the opposite state to which it was switched by the first input pulse.

If the potential at one of the second pair of control terminals is changed to another predetermined value by external means, then, the gate means in addition to being self-controlled by the status of the associated bi-stable device can also be externally controlled. For example, if the potential at one of the second pair of control terminals is maintained at one predetermined value while the potential at the other one of the second pair of control terminals is maintained at another predetermined value by external means, then, when an input pulse is applied to the common input terminal, the gate means causes, as before, a pulse to be transmitted to switch the associated bi-stable device from one state to the opposite regardless of its previous state. But, when the next input pulse is applied to the common input terminal, the gate means, now being controlled not only by the status of the bi-stable device but also by the potentials at the second pair of control terminals blocks transmission of a pulse to switch the bi-stable device until such time as the potential at the other one of the second pair of control terminals is changed back to the one predetermined value. When this occurs, the gate means responds to the next succeeding input pulse by transmitting a pulse to switch the bi-stable device back to its original state. Also, if the potentials at the second pair of control terminals are both changed to another predetermined value, then, the gate means blocks the input pulses from having any effect on the device until such time as the potential at the control terminal on the conducting side of the device is raised sufficiently to permit the gate means to transmit a pulse to switch the device back to its original state.

The commutation circuits are cascaded together to form a ring type of electronic commutator by connecting the output terminals of each device to the second pair of control terminals of the gate means associated with the next succeeding device and commonly connecting the input terminals of each of the gate means to a source of input pulses. Thus, each gate means is self-controlled by the status of its associated bi-stable device and externally controlled by the status of the next preceeding bi-stable device. When an input pulse is applied to the common line the gate means associated with the one device which is in the On state is conditioned to transmit a pulse to switch its associated device to the Off state and the gate means associated with the next succeeding bi-stable device is conditioned to simultaneously transmit a pulse to switch its associated device to the On state. In a similar manner, each succeeding pulse applied to the common input, steps the ring by simultaneously turning Off the device which is presently On and turning On the next succeeding device.

Other objects of the invention will be pointed out in the following description and claims and illustrated in the accompanying drawings, which disclose, by way of examples, the principle of the invention and the best mode, which has been contemplated of applying that principle.

Figure 1:
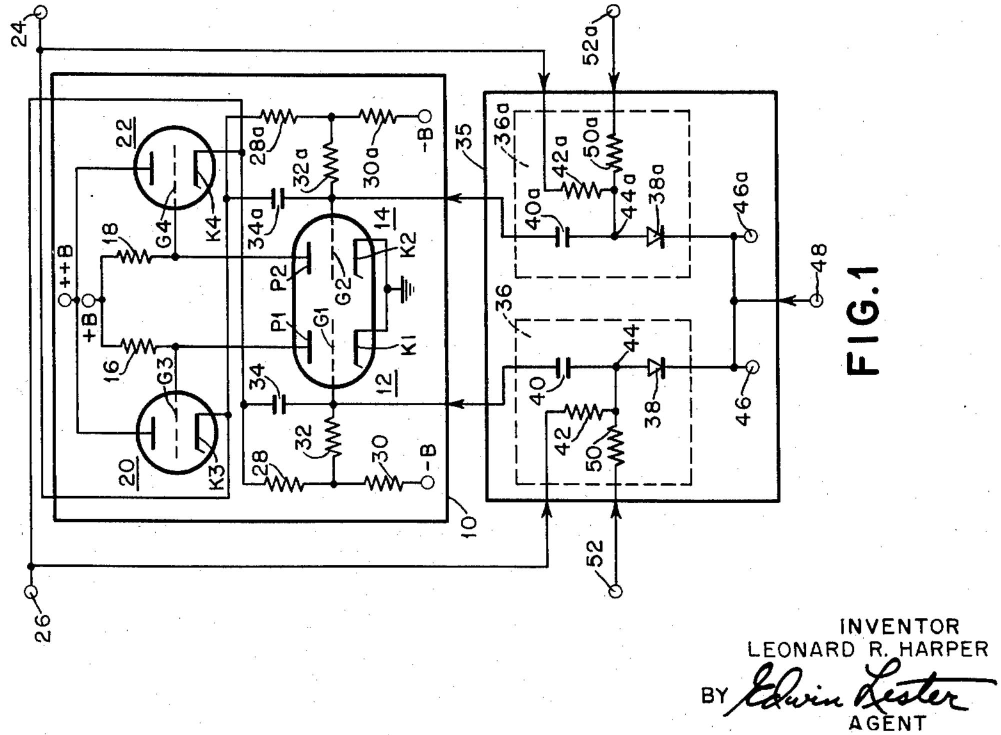
Fig. 1 is a circuit diagram of one embodiment of the commutation circuit used in the electronic commutator of the present invention.

Referring now to the drawings and more particularly to Fig. 1, the bi-stable device 10 may comprise any well known bi-stable device such as the dual vacuum trigger. For the purposes of explanation a pair of the electron tubes 12 and 14 are shown enclosed in one envelope. Tube 12 is provided with a plate P1, a grid G1 and a cathode K1 while tube 14 is provided with a plate P2, a grid G2 and a grounded cathode K2 connected to the cathode K1. Plates P1 and P2 are coupled via resistors 16 and 18, respectively, to a positive source of voltage +B.

The bi-stable device 10 includes a pair of cathode followers 20 and 22. Cathode follower 20 is provided with a plate P3, a grid G3 and a cathode K3 while cathode follower 22 is provided with a plate P4, a grid G4 and cathode K4. Plate P1 is connected to the grid G3 of the cathode follower 20 while plate P2 is connected to the grid G4 of the cathode follower 22. Plates P3 and P4 of the cathode followers 20 and 22, respectively, are interconnected and coupled to a positive source of voltage ++B. The cathodes K3 and K4 of the cathode followers 20 and 22 are respectively connected to the output terminals 24 and 26 and via a voltage divider network, comprising resistors 28 and 30, to a negative source of voltage —B. The junction of resistors 28 and 30 in each voltage divider network is connected via resistors 32 to the grids G1 and G2, respectively. Compensating capacitors 34 are respectively connected between the cathode K4 and the grid G1 and between the cathode K3 and the grid G2.

A gate 35, comprising a pair of diode gate input circuits 36, is connected to both grids of the bi-stable device 10, each consisting of a diode 38, a coupling capacitor 40 and resistors 42 and 50. More specifically, one end of the coupling capacitor 40 is connected to the grid G1 of the tube 12 while the other end of which is connected to the anode of the diode 38. The junction 44 of the coupling capacitor 40 and the diode 38 is connected via the resistor 42 to both the output terminal 26 and the cathode K4 of the cathode follower 22. Similarly, one end of the coupling capacitor 40*a* is connected to the grid G2 of the tube 14 while the other end of which is connected to the anode of the diode 38*a*. This junction 44*a* of the coupling capacitor 40*a* and the diode 38*a* is connected via the resistor 42*a* to both the output terminal 24 and the cathode K3 of the cathode follower 20. The cathodes of the diodes 38 are respectively coupled to the input terminals 46 and are also interconnected and coupled to the common input terminal 48. The junctions 44 are also respectively connected via resistors 50 to control terminals 52.

Figure 2:
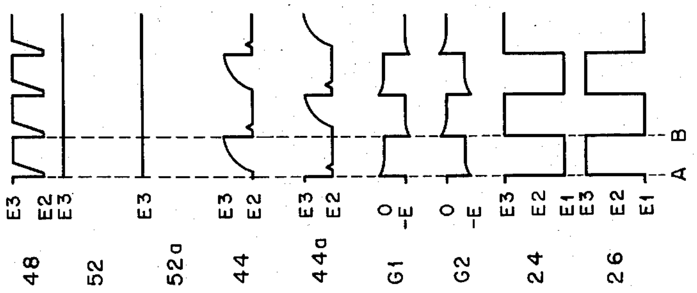
Fig. 2 is a timing diagram illustrating successive cycles of operation of the commutation circuit of Fig. 1 when the potentials at the external control terminals are maintained at a constant predetermined value.

The operation of the commutation circuit shown in Fig. 1 will now be described with reference to the timing diagram of Fig. 2. Fig. 2 shows idealized waveforms at various points in the commutation circuit, during successive cycles of operation, when the potentials at the control terminals 52 are maintained at a constant predetermined value. While no reset means are shown, it is to be understood that such may be provided in any conventional manner and in accordance with the particular use to which the device is put. The bi-stable device 10, as illustrated, when energized, will assume one of its two stable states. For the purposes of explanation, let it be assumed that the device 10 is initially in the Off state with the tube 14 conducting and the tube 12 non-conducting. Consequently, the grid G2 is at a potential of 0 volts while the grid G1 is at a relatively negative potential of —E volts. Plate P1, via the cathode follower 20, causes a relatively high positive potential of E3 volts to be maintained at the output terminal 24 while plate P2, via the cathode follower 22, causes a relatively low positive potential of E1 volts to be maintained at the output terminal 26. Also, let it be assumed that the control terminals 52 are maintained at the same potential as that which exists at the output terminal 24, namely, E3 volts. Therefore, since the potential at the output terminal 26 is at the relatively low positive value of E1 volts and the potential at the control terminal 52 is at the relatively high positive value of E3 volts, then, due to the voltage dividing action of the resistors 42 and 50, the potential at the junction 44 is maintained at an intermediate positive value of E2 volts. Also, since the potentials at the output terminal 24 and the control terminal 52*a* are both at the relatively high positive value of E3 volts, then, the potential at the junction 44*a* is maintained at the same relatively high positive value of E3 volts.

At time A, let it assumed that a negative input pulse, shifting from E3 volts to E2 volts, is applied to the common input terminal 48 with the resulting effect that the potential at the cathodes of the diodes 38 are driven down to a value of E2 volts. Since the potential at the anode of diode 38 is also at E2 volts, this negative shift of potential will not lower the potential at the cathode of diode 38 sufficiently to cause conduction therethrough. Therefore, the negative input pulse is blocked by diode 38 and, consequently, has no effect on the grid G1. However, since the potential at the anode of diode 38*a* is at a value of E3 volts, the negative shift of potential at the cathode of diode 38*a*, from E3 volts to E2 volts, causes conduction therethrough and the potential at the junction 44*a* drops sharply down to a value of E2 volts. Since the voltage across a capacitor cannot change instantaneously, the negative spike at the junction 44a passes via the coupling capacitor 40a to drive the potential at the grid G2 below the cut-off value and cause the tube 14 to stop conducting. The plate P2 now experiences a relatively sharp positive voltage swing which passes via the cathode follower 22 to the output terminal 26 and to the compensating capacitor 34. The positive voltage swing passes via the compensating capacitor 34 to raise the potential at the grid G1 above the cut-off value and allow tube 12 to start conducting. The positive voltage swing is also applied to an RC network in gate 36 which causes the coupling capacitor 40 to start charging and raise the potential at the junction 44 exponentially from E2 volts toward E3 volts. At the same time, plate P1 experiences a relatively sharp negative voltage swing which passes via the cathode follower 20 to the output terminal 25 and to the compensating capacitor 34a. The negative voltage swing passes via the compensating capacitor 34a to maintain the potential at the grid G2 below the cut-off value and via the resistor 42a to maintain the potential at the junction 44a at E2 volts.

During the time interval from A to B, the potential at the grid G1 falls exponentially toward 0 volts, the potential at the junction 44 rises exponentially toward E3 volts, the potential at the grid G2 rises exponentially toward —E volts and the potential at the junction 44a is maintained at E2 volts so that at time B, the condition of the bi-stable device 10 is completely reversed, with tube 12 now conducting and tube 14 now non-conducting. The next negative input pulse applied to the common input terminal 48, at time B, is steered to the grid of the tube which is now conducting, namely, grid G1, in a manner as previously described, to cause the device 10 to be switched back to the Off state. Hence, it is apparent that so long as a relatively high positive potential is maintained at the control terminals 52, the bi-stable device 10 will successively go On and Off as the negative input pulses are applied at the common input terminal 48.

It should be noted that the commutation circuit may be controlled in various ways by varying the potentials at the control terminals 52. Thus, for example, let it be assumed that the device 10 is in the Off state and the potential at the control terminal 52 is switched to a value of E1 volts while the potential at the control terminal 52a is maintained at a value of E3 volts. Then, since the potentials at the output terminal 26 and the control terminal 52 are now both at E1 volts, the potential at the junction 44 is maintained at E1 volts. Also, since the potentials at the output terminal 24 and the control terminal 52a are both at E3 volts, then, the potential at the junction 44a is maintained at E3 volts. When a negative input pulse is applied to the common input terminal 48, the potentials at the cathodes of diodes 38 are lowered to E2 volts, which is not sufficient to cause conduction in diode 38, which, therefore, blocks the negative input pulse from having any effect on the grid G1 but is sufficient to cause conduction of diode 38a and thereby transfer a negative spike, via coupling capacitor 40a, to drive the potential at the grid G2 below the cut-off value and initiate switching the device 10 to the On state. When the switching action is completed, since the potential at the output terminal 26 is now at E3 volts and the potential at the control terminal 52 remains at E1 volts, then, the potential at the junction 44 rises to an intermediate positive value of E2 volts. Also, since the potential at the output terminal 24 is now at E1 volts and the potential at the control terminal 52a remains at E3 volts, then, the potential at the junction 44a falls to the intermediate value of E2 volts. Therefore, since the potentials at the junctions 44 and, in effect, at the anodes of diodes 38 are both at E2 volts and since the potential of the input pulse at the cathodes of diodes 38 shifts from E3 volts to E2 volts, then, the diodes 38 do not conduct and effectively block the negative input pulse from switching the device 10 until such time as the potential at the control grid 52 is switched back to the original value of E3. When this occurs, the potential at the anode of diode 38 rises to a value of E3 volts so that when the next succeeding negative input pulse is applied to the device 10, the diode 38 conducts and causes a negative spike to be passed, via the coupling capacitor 40, to drive the potential at the grid G1 below the cut-off value and initiate switching the device 10 back to the Off state. Also, it should be apparent that regardless of the state of the device 10, if the potentials at both of the control terminals 52 are maintained at relatively low positive values the commutation circuit will not respond to any input pulses until such time as the potential at the control terminal on the conducting side of the device is raised sufficiently to permit transmisison of a pulse to switch the device 10 to its opposite state.

Figure 3:
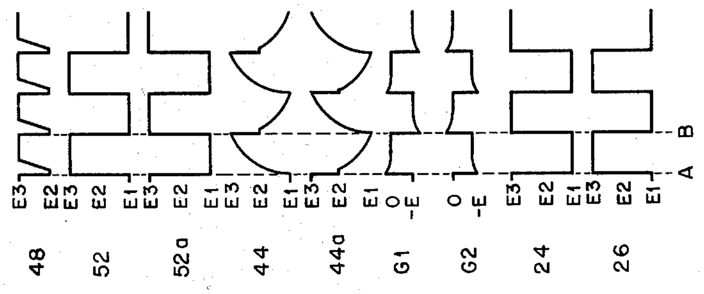
Fig. 3 is a timing diagram illustrating successive cycles of operation of the commutation circuit of Fig. 1 when the potentials at the external control terminals are varied.

The operation of the commutation circuit shown in Fig. 1 will now be described with reference to the timing diagram of Fig. 3. Fig. 3 shows idealized waveforms at various points in the commutation circuit, during successive cycles of operation, when square wave type of signals are applied to the control terminals 52. Again, for the purposes of explanation, let it be assumed that the device 10 is initially in the Off state with the tube 14 conducting and the tube 12 non-conducting. Consequently, the grid G2 is at a potential of 0 volts while grid G1 is at the relatively negative potential of —E volts. The potential at the output terminal 24, as before, is at the relatively high positive value of E3 volts while the potential at the output terminal 26 is at the relatively low value of E1 volts. Now, let it be assumed that a square wave type of signal varying between E1 volts and E3 volts is applied to the control terminal 52 and a similar signal but 180° out of phase is applied to the other control terminal 52a, as for example, if the control terminals were connected to the output terminals of a similar binary operated commutation circuit. Therefore, at time A, since the potentials at the output terminal 26 and the control terminal 52 are both at the relatively low positive value of E1 volts, then, the potential at the junction 44 is maintained at the junction 44 is maintained at the same relatively low positive value of E1 volts. Also, since the potentials at the output terminal 24 and the control terminal 52a are both at the relatively high positive value of E3 volts, then, the potential at the junction 44a is maintained at the relatively high positive value of E3 volts.

At time A, a negative input pulse is applied to the common input terminal 48 with the resulting effect that the potentials at the cathodes of diodes 38 are driven down to a value of E2 volts. Now, since the potential at the anode of diode 38 is at E1 volts, this negative shift of potential will not lower the potential at the cathode of the diode 38 sufficiently to cause conduction therethrough. Therefore, the negative pulse is again blocked by diode 38 and, consequently, has no effect on the grid G1. However, since the potential at the anode of diode 38a is at a value of E3 volts, the negative shift of potential at the cathode of diode 38a, from E3 volts to E2 volts, causes conduction therethrough and the potential at the junction 44a drops sharply down to a value of E2 volts. The negative spike at the junction 44a passes via the coupling capacitor 40a to drive the potential at the grid G2 below the cut-off value and cause the tube 14 to stop conducting. As before, plate P2 experiences a relatively sharp positive voltage swing which passes via the cathode follower 22 to the output terminal 26 and to the compensating capacitor 34. The positive voltage swing passes via the compensating capacitor 34 to the grid G1 causing the potential thereat to rise above the cut-off value and allow tube 12 to start conducting. The positive voltage swing, as before, is also applied to the RC network in gate 36 which causes the coupling capacitor 40 to start charging. At the same time, the potential at the control terminal 52 is switching from E1 volts to E3 volts with the resulting effect that the potential at the junction 44 and, in effect, at the anode of diode 38 rises exponentially from E1 volts toward E3 volts. Also, as before, plate P1 experiences a relatively sharp negative voltage swing which passes via the cathode follower 20 to the output terminal 24 and to the compensating capacitor 34*a*. The negative voltage swing passes via the compensating capacitor 34*a* to the grid G2, to maintain the tube 14 non-conducting, and to the RC network in gate 36*a* which causes the coupling capacitor 40*a* to start discharging. At the same time, the potential at the control terminal 52*a* is swiching from E3 volts to E1 volts with the resulting effect that the potential at the junction 44*a* and at the anode of the diode 38*a* falls exponentially from E2 volts toward E1 volts.

Thus, during the time interval from A to B the potential at grid G1 volts falls exponentially toward 0, the potential at the junction 44 rises exponentially toward E3 volts, the potential at the grid G2 rises exponentially toward —E volts and the potential at the junction 44*a* falls exponentially toward E1 volts so that by time B, the condition of the bi-stable device 10 is completely reversed, as before, with tube 12 now conducting and tube 14 now non-conducting. Hence, at time B, the next negative input pulse applied to the common input terminal 48 is steered to the grid of the tube which is now conducting, namely, grid G1, in a manner as previously described, to cause the device 10 to be switched back to the Off state. Therefore, it is appaernt, that so long as the potentials at the control terminals 52 are properly controlled the bisable device 10 will, again, successively go On and Off as the negative input pulses are applied at the common input terminal 48.

Figure 4:
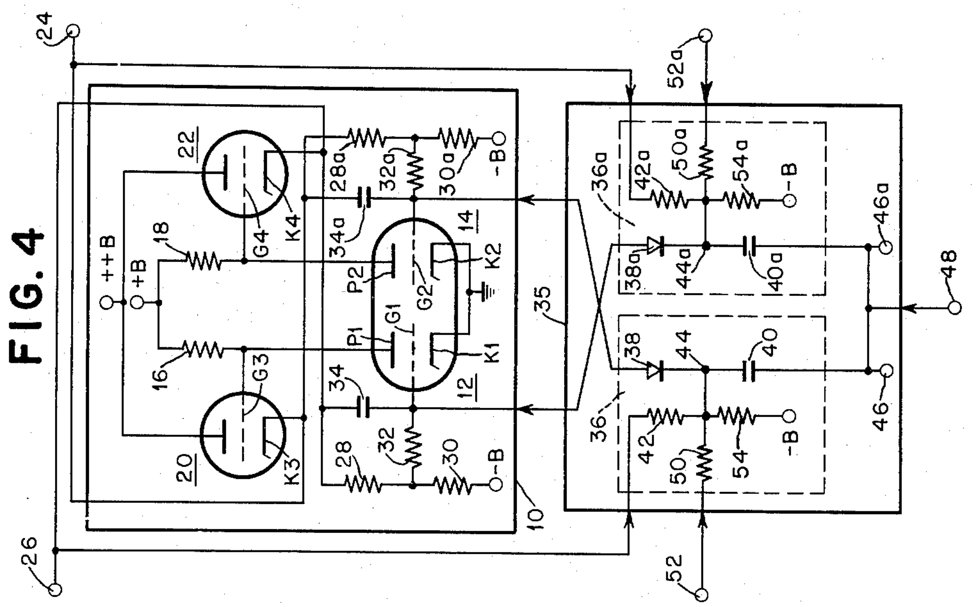
Fig. 4 is a circuit diagram of another embodiment of the commutation circuit employed in the electronic commutator of the present invention.

Referring now to Fig. 4, the bi-stable device 10 is identical to that shown in Fig. 1 and, consequently, no detailed description thereof is believed necessary. The gate 35 is somewhat different from that shown in Fig. 1 and comprises a pair of diode gate input circuits 36 connected to the grids of the bi-stable device 10, each of which consists of a diode 38, a coupling capacitor 40 and a resistor network including resistors 42, 50 and 54. More specifically, the anode of diode 38 is connected to the grid G2 while the cathode is connected to one end of the coupling capacitor 40. The junction 44 of the coupling capacitor 40 and the diode 38 is connected to the junction of a voltage divider network, comprising resistors 42 and 54 connected, respectively, between the output terminal 26 and, in effect, the cathode K4 of the cathode follower 22 and a negative source of voltage —B. Similarly, the anode of the diode 38*a* is connected to the grid G1 while the cathode is connected to one end of the coupling capacitor 40*a*. The junction 44*a* of the coupling capacitor 40*a* and the diode 38*a* is connected to the junction of a voltage divider network, consisting of resistors 42*a* and 54*a* connected, respectively, between the output terminal 24 and, in effect, the cathode K3 of the cathode follower 20 and a negative source of voltage —B. The other ends of the coupling capacitors 40 are respectively coupled to the input terminals 46 and are also interconnected and coupled to the common input terminal 48. The cathodes of the diodes 38, that is, junctions 44 are also respectively connected via resistors 50 to the control terminals 52.

Figure 5:
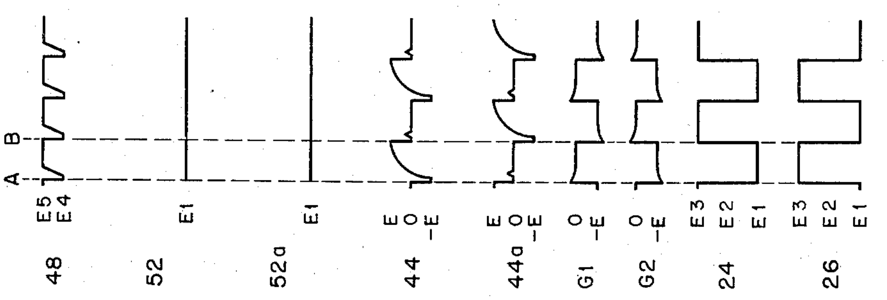
Fig. 5 is a timing diagram illustrating successive cycles of operation of the commutation circuit of Fig. 4 when the potentials at the external control terminals are maintained at a constant predetermined value.

The operation of the commutation circuit shown in Fig. 4 will now be described with reference to the timing diagram of Fig. 5. Fig. 5 shows the idealized waveforms at various points in the commutation circuit, during successive cycles of operation, when the potentials at the control terminals 52 are maintained at a constant predetermined value. As before, for the purpose of explanation, let it be assumed that the device 10 is initially in the Off state with the tube 14 conducting and the tube 12 non-conducting. Again, the grid G2 is at a potential of 0 volts while the grid G1 is at a relatively negative potential of —E volts. Plate P1, of the non-conducting tube 12, is effective to maintain the potential at the output terminal 24 at a relatively high positive value of E3 while plate P2, of the conducting tube 14, is effective to maintain the potential at the output terminal 26 at a relatively low positive value of E1 volts, in a manner as previously described. Also, let it be assumed that the potentials at the control terminals 52 are maintained at the same value as that which exists at the output terminal 26, namely, E1 volts. Therefore, since the potentials at the output terminal 26 and the control terminal 52 are both at the relatively low positive value of E1 volts, then, the current through resistor 54 is such as to maintain the potential at junction 44 at 0 volts. Also, since the potential at the output terminal 24 is at the relatively high positive value of E3 volts and the control terminal 52*a* is at the relatively low positive value of E1 volts, then, the current through resistor 54*a* is such as to maintain the potential at junction 44*a* at E volts.

At time A, a negative input pulse is applied to the common input terminal 48 which passes via the coupling capacitors 40 to the cathodes of diodes 38. Consequently, the potentials at the cathodes of diodes 38 are driven down an equal amount, that is, the potential at junction 44 and, in effect, the cathode of diode 38 is driven from 0 volts to —E volts while the potential at junction 44*a* and, in effect, the cathode of diode 38*a* is driven from E volts to 0 volts. Since the potential at the anode of diode 38*a* is at —E volts, this negative shift of potential at the cathode of diode 38*a*, from E volts to 0 volts, does not lower the potential at the cathode sufficiently to cause the diode 38*a* to conduct. Therefore, the diode 38*a* blocks the negative input pulse from having any effect on the grid G1 of the tube 12. However, since the potential at the anode of diode 38 is at 0 volts, the negative shift of the potential at the cathode of the diode 38, from 0 volts to —E volts, causes the diode 38 to conduct and apply a negative spike to the grid G2 driving the potential thereat below the cut-off value and cause the tube 14 to stop conducting. The plate P2 now experiences, as before, a relatively sharp positive voltage swing which is effectively applied to the output terminal 26 and the compensating capacitor 34. The positive voltage swing passes via the compensating capacitor 34 to the grid G1 causing the potential thereat to rise above the cut-off value and allow tube 12 to start conducting. The positive voltage swing is also applied to an RC network in gate 36 which causes the coupling capacitor 40 to start charging with the resulting effect that the potential at the junction 44 and at the cathode of diode 38 rises exponentially from —E volts toward E volts. At the same time, plate P1 effectively passes a relatively sharp negative voltage swing to the output terminal 24 and to the compensating capacitor 34*a*. The negative voltage swing passes via the compensating capacitor 34*a* to the grid G2 to maintain the tube 14 non-conducting and to an RC network in gate 36*a* with the resulting effect that the current in resistor 54*a* is such as to maintain the junction 44*a* and, in effect, the cathode of diode 38*a* at 0 volts.

Thus, during the interval from A to B, the potential at the grid G1 falls exponentially towards 0 volts, the potential at the junction 44 rises exponentially towards E volts, the potential at the grid G2 rises exponentially towards —E volts and the potential at the junction 44*a* is maintained at 0 volts so that by time B, the condition of the bi-stable device 10 is reversed. The next negative input pulse applied to the common input terminal 48 is, again, steered to the grid of the tube which is now conducting, namely, grid G1, in a manner as previously described, to cause at the bi-stable device 10 to be switched back to the Off state. Hence, it is apparent that so long as a relatively low positive potential is maintained at the control terminals 52 the bi-stable device 10 successively goes On and Off as the negative input pulses are applied at the common input terminal 48.

As before, the commutation circuit of Fig. 4 may be controlled in various ways by varying the potentials at the control terminals 52. Thus, for example, assuming that the device 10 is Off and the potential at the control terminal 52*a* is switched to a value of E3 volts while the potential at the control terminal 52 is maintained at a value of E1 volts. Then, since the potentials at the output terminal 26 the control terminal 52 is maintained at a value of E1 volts. Then, since the potentials at the output terminal 26 the control terminal 52 are now both at E1 volts, the current through resistor 54 is such as to maintain the potential at junction 44 and, in effect, the cathode of the diode 38 at 0 volts. Also, since the potentials at the output terminal 24 and the control terminal 52*a* are at a value of E3 volts, then, the current in resistor 54*a* is such as to raise the potential at junction 44*a* to E1 volts. Now, when a negative input pulse is applied to the common input terminal 48, the potentials at the cathodes of diodes 38 are driven down an equal amount which is not sufficient to cause conduction in diode 38*a* but is sufficient to cause conduction in diode 38. Therefore, the diode 38*a* blocks the input pulses from having any effect on the grid G1 while the diode 38 is effective to transfer a negative spike to drive the potential at the grid G2 below the cut-off value and initiate switching On the device 10. When the switching action is completed, since the potential at the output terminal 26 is now at E3 volts and the potential at the control terminal remains at E1 volts, then, the potential at junction 44 rises toward a value of E volts. Also, since the potential at the output terminal 24 is now at E1 volts and the potential at the control terminal 52*a* is at E3 volts, then, the potential at junction 44*a* falls toward a value of E volts. Under such conditions, the potentials at the cathodes of diodes 38 are not driven sufficiently negative by the input pulses to permit either one of the diodes 38 to conduct. Therefore, the diodes 38 block the negative input pulses from switching the bi-stable device 10 until such time as the potential at the control grid 52*a* is switched back to the original value of E1 volts. When this occurs, the current through resistor 54*a* is such as to lower the potential at the cathode of diode 38*a* to a value of 0 volts so that when the next succeeding negative input pulse is applied to the device 10, the diode 38*a* conducts and is effective to transfer a negative spike to drive the potential at the grid G1 below the cut-off value and initiate switching Off the device 10. Also, as before, it should be apparent that regardless of the state of the device 10, if the potentials at the control terminals 52 are maintained at relatively high positive values the commutation circuit will not respond to any input pulses until such time as the potential at the control terminal on the non-conducting side of the device is lowered sufficiently to permit transmission of a pulse to switch the device 10 to its opposite state.

Figure 6:
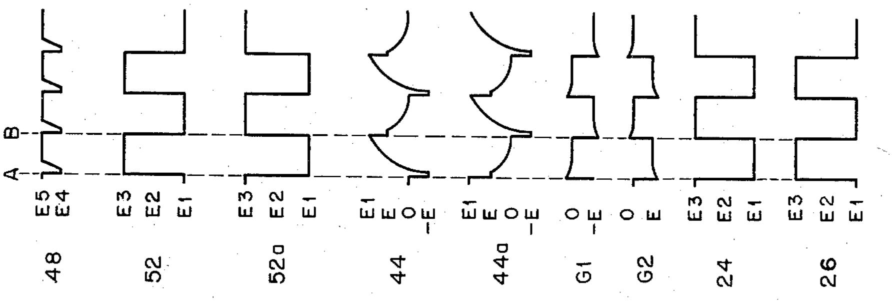
Fig. 6 is a timing diagram illustrating successive cycles of operation of the commutation circuit of Fig. 4 when the potentials at the external control terminals are varied.

The operation of the commutation circuit shown in Fig. 4 will now be described with reference to the timing diagram of Fig. 6. Fig. 6 shows idealized waveforms at various points in the commutation circuit, during successive cycles of operation, when square wave type of signals are applied to the control terminals 52. Again, for the purposes of explanation, let it be assumed that the device 10 is initially in the Off state with the tube 14 conducting and the tube 12 non-conducting. Consequently, the grid G2 is at a potential of 0 volts while the grid G1 is at a relatively negative potential of —E volts. The output terminal 24, as before, is at a relatively high positive potential of E3 volts while the output terminal 26 is at a relatively low potential of E1 volts. Now, let it be assumed that a square wave type of signal varying between E1 volts and E3 volts is applied to the control terminal 52 and a similar signal but 180° out of phase is applied to the other control terminal 52*a*. Therefore, since the potentials at the output terminal 26 and the control terminal 52 are both at the relatively low positive value of E1 volts, then, the current in resistor 54 is such as to maintain the junction 44 and, in effect, the cathode of diode 38 at 0 volts. Also, since the potentials at the output terminal 24 and the control terminal 52*a* are both at the relatively high positive value of E3 volts, then, the current in resistor 54*a* is such as to maintain the junction 44*a* and, in effect, the cathode of diode 38*a* at E1 volts.

At time A, a negative input pulse is applied to the common input terminal 48 which passes via the coupling capacitors 40 to the cathodes of the diodes 38. The potentials at the cathodes of diodes 38 are driven down an equal amount, that is, the junction 44 and, in effect, the cathode of diode 38 is driven from 0 volts to —E volts while the junction 44*a* and, in effect, the cathode of diode 38*a* is driven from E1 volts to E volts. Since the potential at the anode of diode 38*a* is at —E volts, this negative shift of potential at the cathode of diode 38*a*, from E1 volts to E volts does not lower the potential at the cathode sufficiently to cause conduction in diode 38*a*. Therefore, the diode 38*a* effectively blocks the negative input pulse from having any effect on the grid G1. However, since the potential at the anode of the diode 38 is at 0 volts, the negative shift of potential at the cathode of the diode 38, from 0 volts to —E volts, causes the diode 38 to conduct and apply a negative spike to the grid G2 driving the potential thereat below the cut-off value and cause the tube 14 to stop conducting. The plate P2 now experiences, as before, a relatively sharp positive voltage swing which is effectively applied to the output terminal 26 and the compensating capacitor 34. The positive voltage swing passes via the compensating capacitor 34 to cause the potential at the grid G1 to rise above the cut-off value and allow tube 12 to start conducting. The positive voltage swing is also applied to an RC network in the gate 36 which causes the coupling capacitor 40 to start charging. At the same time, the potential at the control terminal 52 is switching from E1 volts to E3 volts with the resulting effect that the potential at the junction 44 and, in effect, at the cathode of diode 38 rises exponentially from —E volts toward E1 volts. Also, plate P1 effectively passes a relatively sharp negative voltage swing to the output terminal 24 and to the compensating capacitor 34*a*. The negative voltage swing passes via the compensating capacitor 34*a* to the grid G2 to maintain the tube 14 non-conducting and to the RC network in gate 36*a* which causes the coupling capacitor 40*a* to start discharging. At the same time, the potential at the control terminal 52*a* is switching from E3 volts to E1 volts with the resulting effect that the potential at the junction 44*a* and, in effect, the cathode of diode 38*a* falls exponentially from E volts toward 0 volts.

Thus, during the time interval from A to B, the potential at the grid C1 falls exponentially toward 0 volts, the potential at the junction 44 rises exponentially toward E1 volts, the potential at the grid G2 rises exponentially toward —E volts and the potential at the junction 44*a* falls exponentially toward 0 volts so that by time B, the condition of bi-stable device 10 is completely reversed. Hence, at time B, the next negative input pulse applied to the common input terminal 48 is steered to the grid of the tube which is now conducting, namely, grid G1, in a manner as previously described, to cause the bi-stable device 10 to be switched back to the Off state. Therefore, it is apparent, that so long as the potentials at the control terminals 52 are properly controlled, the bi-stable device 10 successively goes On and Off as the negative input pulses are applied at the common input terminal 48.

It will be understood that various omissions and substitutions and changes in the form and details of the circuits illustrated in Figs. 1 and 4 and in its operation may be made by those skilled in the art without departing from the spirit of the invention. As for example, the control terminals 52 may be connected together so as to be singularly controlled. Also, if a singularly operated rather than binary operated circuit is desired, the inputs to the gates 36 need not be connected together but may be independent of each other so that input pulses may be separately applied to the input terminals 46. Additionally, the RC time constant in the gates 36 can be varied up to the limit of the time required to switch the bi-stable device from one state to the other which, because of the minimized loading of the cathode followers, is of extremely short duration.

Figure 7:
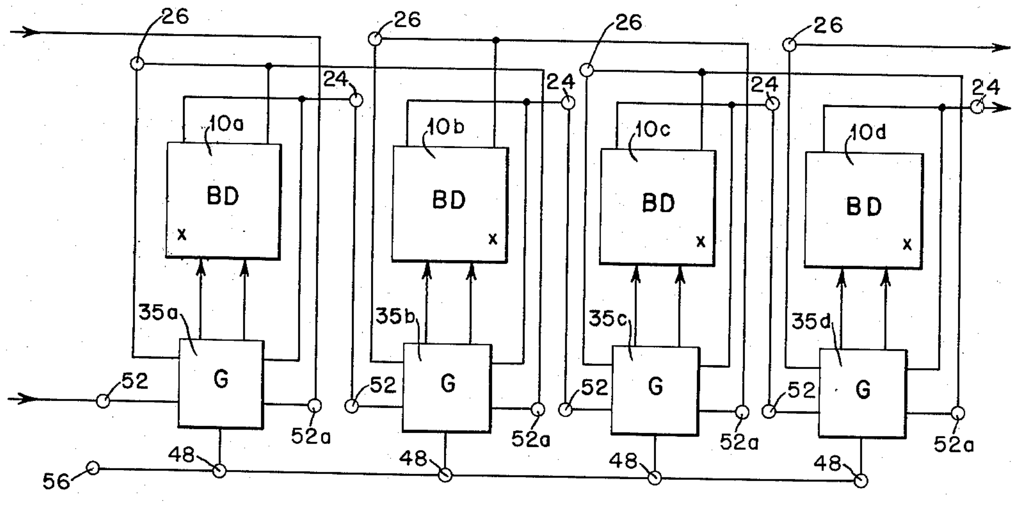
Fig. 7 is a block diagram of the ring type of electronic commutator of the present invention.

Referring now to Fig. 7 there is illustrated therein a ring type of an electronic commutator consisting of a plurality of cascaded binary commutation circuits, each consisting of a bi-stable device 10 and a gate 35. The bi-stable devices 10 and gates 35 are merely indicated in block diagram form in order to simplify the illustration. The state of each bi-stable device 10 is denoted by a small *x* adjacent the side of the device 10 which is in the conductive state.

A source of negative pulses (not shown) is connected via the input terminal 56 to the input terminals 48 of each of the commutation circuits of the electronic commutator. The output terminals of each of the gates 35 are respectively connected to the input terminals of each of the bi-stable devices 10 while the output terminals 24 and 26 of each of the bi-stable devices 10 are connected to a pair of inputs of its associated gate 35 and to the control terminals 52 and 52*a*, respectively, of the next succeeding gate 35. For example, the output terminals 24 and 26 of the bi-stable device 10*a* are connected to a pair of inputs of gate 35*a* and to the control terminals 52 and 52*a*, respectively, of the gate 35*b*. The commutator may be open, that is, means (not shown) may be provided for turning on the first device in the ring or the ring may be closed so that the output terminals 24 and 26 of the last device 10*d* may be connected to the control terminals 52 and 52*a*, respectively, of the gate 35*a* so that the On state may proceed automatically from the last device in the ring to the first.

At the start of operation let it be assumed that the bi-stable 10*a* is set to the On state while the remaining devices 10*b* to 10*d* are in the Off state as shown in Fig. 7. Also, let is be assumed that the potential at the control terminal 52 of the gate 35*a* is at a relatively high positive value while the potential at the control terminal 52*a* of gate 35*a* is at a relatively low positive value, either due to separate means (not shown) or if the ring is closed due to the potentials at the output terminals 24 and 26, respectively, of the bi-stable device 10*d*. Since the bi-stable device 10*a* is in the On state, the potential at the output terminal 24 is at a relatively low positive value which is applied to the upper right hand input of the associated gate 35*a* and to the control terminal 52 of the succeeding gate 35*b*. Likewise, under the assumed condition, the potential at the output terminal 26 is at a relatively high positive value which is applied to the upper left input of the associated gate 35*a* and to the control terminal 52*a* of the next succeeding gate 35*b*. Also, since the bi-stable devices 10*b* to 10*d* are in the Off state, the potentials at their output terminals 24 are at relatively high positive values and are respectively applied to the upper right input of their associated gates 35*b* to 35*d* and to the control terminals 52 of the next succeeding gates 35*c* and 35*d*. Likewise, the potentials at their output terminals 26 are at relatively low positive values and are respectively applied to the upper left hand input of their associated gates 35*b* to 35*d* and to the control terminals 52*a* of the next succeeding gates 35*c* and 35*d*. Thus, initially, the potentials at the left hand inputs of gate 35*a* are at relatively high positive values while the potentials at the right hand inputs of gate 35*a* are at relatively low positive values. Also, the potentials at the left hand inputs of gate 35*b* are at relatively low positive values while the potentials at the right hand inputs of gate 35*b* are at relatively high positive values. However, the upper left hand inputs of gates 35*c* and 35*d* are at relatively low positive values while the potentials at the lower left inputs of gates 35*c* and 35*d* are at relatively high positive values. Similarly, the potential at the upper right hand inputs of gates 35*c* and 35*d* are at relatively high positive values while the potentials at the right hand inputs of gates 35*c* and 35*d* are at relatively low positive values. Therefore, gates 35*a* and 35*b* are conditioned to transmit a pulse to their associated bi-stable devices 10*a* and 10*b* while gates 35*c* and 35*d* are conditioned to block transmission of a pulse to their associated bi-stable devices 10*c* and 10*d* in a manner as previously described. Consequently, when an input pulse is applied to the input terminal 56, gates 35*a* and 35*b* respond thereto by simultaneously transmitting a pulse to switch the bi-stable device 10*a* to the Off state and to switch the bi-stable device 10*b* to the On state, respectively, while gates 35*c* and 35*d* block the input pulse from having any effect on their associated bi-stable devices 10*c* and 10*d*.

Now, with the bi-stable device 10*b* being in the On state and the remaining bi-stable devices 10*a*, 10*c* and 10*d* being in the Off states the gates 35*b* and 35*c* are conditioned to transmit a pulse to their associated devices 10*b* and 10*c* while the gates 35*a* and 35*b* are conditioned to block the transfer of a pulse to their associated devices 10*a* and 10*d*, in a similar manner as previously described, so that when the next input pulse is applied to the input terminal 56, the gates 35*b* and 35*c* respond thereto by simultaneously transferring a pulse to switch the device 10*b* to the Off state and to switch the device 10*c* to the On state. Thus, in a similar manner, each succeeding pulse applied to the input terminal 56 steps the ring by simultaneously turning Off the device 10 which is presently On and turning On the next succeeding device 10 which is presently Off.

Figure 8:
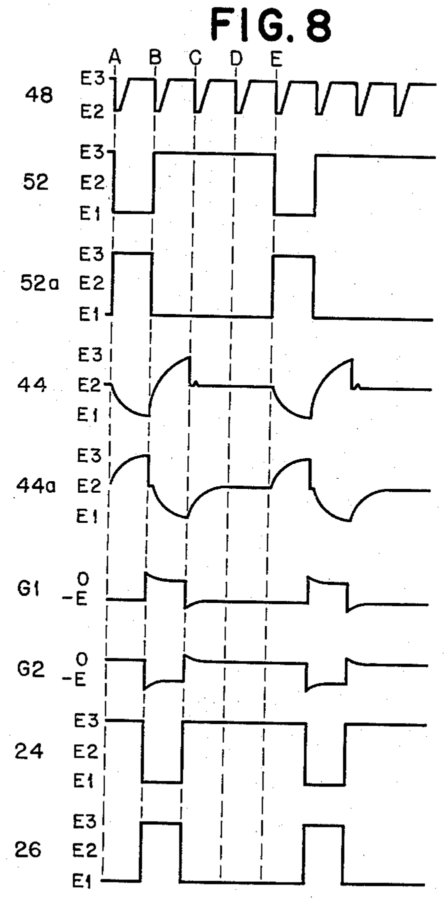
Fig. 8 is a timing diagram illustrating successive cycles of operation of one stage of the electronic commutator of the present invention employing the commutation circuit of Fig. 1.

The electronic commutator shown in Fig. 7 may consist of a plurality of cascaded stages, each consisting of a binary commutation circuit of the type shown in Fig. 1. The operation of a typical stage of the commutator, employing the commutation circuit of Fig. 1, will now be described in conjunction with Fig. 8 which shows the waveforms at various points in stage *c* during successive cycles of operation.

Initially, let it be assumed that the bi-stable device 10*a* is On while the bi-stable devices 10*b* to 10*d* are Off, as shown in Fig. 7. Therefore, the output terminals 24 and 26 of device 10*c*, are at potentials of E3 volts and E1 volts, respectively. Also, the control terminals 52 and 52*a* of gate 35*c*, being respectively connected to the output terminals 24 and 26 of device 10*b*, are at potentials of E3 volts and E1 volts, respectively. Consequently, the junctions 44, and, in effect, the anodes of diodes 38 are maintained at a potential of E2 volts.

At time A, a negative input pulse, shifting from E3 volts to E2 volts, is applied to the common input terminal 56 with the resulting effect in stage *c* being that the potentials at the cathodes of diodes 38 are driven down to E2 volts. Since the potentials at the anodes of diodes 38 are also at E2 volts, this negative shift of potential at the cathodes, from E3 volts to E2 volts, is not sufficient to permit diodes 38 to conduct. Hence, diodes 38 in gate 35*c* block the negative input pulse from switching the device 10*c*. At the same time, the input pulse is effective to turn Off the device 10*a* and to turn On the device 10*b* causing the potentials at the control terminals 52 and 52*a* of gate 35*c*, to be switched to E1 volts and E3 volts, respectively. Now, since the potentials at the output terminal 26 and the control terminal 52 are both at E1 volts, then, during the time interval from A to B, the potential at the junction 44 falls exponentially toward E1 volts. Also, since the potentials at the output terminal 24 and the control terminal 52*a* are now both at E3 volts, then, during the time interval from A to B, the potential at the junction 44*a* rises exponentially toward E3 volts so that by time B the potentials at the anodes of diodes 38 and 38*a* are at E1 volts and E3 volts, respectively.

At time B, a negative input pulse is again applied to the common input terminal 56 with the resulting effect in stage *c* being that the potentials at the cathodes of diodes 38 are again driven down to E2 volts. Now, since the potential at the anode of diode 38 is E1 volts, this negative shift of potential at the cathode of diode 38, from E3 volts to E2 volts, is not sufficient to cause conduction therethrough and, therefore, diode 38 blocks the input pulse from having any effect on the device 10*c*. However, since the potential at the anode of diode 38*a* is now at E3 volts, the negative shift of potential at the cathode, from E3 volts to E2 volts, causes diode 38*a* to conduct and effectively transfer a negative spike to initiate switching On the device 10*c*. Device 10*c*, in being turned On, effectively causes a positive voltage swing to be applied to the output terminal 26 and to the RC network in gate 36 to cause the coupling capacitor 40 to start charging. Device 10*c* also effectively causes a negative voltage swing to be applied to the output terminal 24 and to the RC network in gate 36*a* to cause the coupling capacitor 40*a* to start discharging. At the same time that the device 10*c* is turned On, the input pulse is effective to turn Off the device 10*b* causing the potentials at the control terminals 52 and 52*a* of gate 35*c* to be switched to E3 volts and E1 volts, respectively. Therefore, since the potentials at the output terminal 26 and the control terminal 52 are now both at E3 volts, then, during the time interval from B to C, the potential at the junction 44 rises exponentially toward E3 volts. Also, since the potentials at the output terminal 24 and the control terminal 52*a* are now both at E1 volts, then, during the time interval from B to C, the potential at the junction 44*a* falls exponentially toward E1 volts so that by time C the potentials at the anodes of diodes 38 and 38*a* are at E3 volts and E1 volts, respectively.

At time C, a negative input pulse is again applied to the common input terminal 56 with the resulting effect in stage *c* being that the potentials at the cathodes of diodes 38 are again driven down to E2 volts. Now, since the potential at the anode of diode 38*a* is at E1 volts, this negative shift of potential at the cathode of diode 38*a*, from E3 volts to E2 volts, is not sufficient to cause conduction therethrough and, therefore, the diode 38*a* blocks the input pulse from having any effect on the device 10*c*. However, since the potential at the anode of diode 38 is at E3 volts, the negative shift of potential at the cathode, from E3 volts to E2 volts, causes diode 38 to conduct and effectively transfer a negative spike to initiate switching Off the device 10*c*. At the same time that device 10*c* is turned Off, the input pulse is effective to turn On the device 10*d*. Device 10*c*, in being turned Off, effectively causes the potentials at the output terminals 24 and 26 to be switched to E3 volts and E1 volts, respectively. Since the device 10*b* does not change state at time C the potentials at the control terminals 52 and 52*a* of gate 35*c* remain at E3 volts and E1 volts, respectively. Therefore, since the potential at the output terminal 26 is at E1 volts and the potential at the control terminal 52 is at E3 volts, then, during the time interval from C to D, the potential at the junction 44 is maintained at E2 volts. Also, since the potential at the output terminal 24 is at E3 volts and the potential at the control terminal 52*a* is at E1 volts, then, during the time interval from C to D, the potential at the junction 44*a* rises exponentially toward E2 volts so that by time D the potentials at the anodes of diodes 38 are at E2 volts.

At time D, a negative input pulse is again applied to the common input terminal 56 with the resulting effect in stage *c* being that the potentials at the cathodes of diodes 38 are again driven down to E2 volts. Since the potentials at the junction 44 and, in effect, at the anodes of diodes 38 are also at E2 volts, this negative shift of potential at the cathodes, from E3 volts to E2 volts, is not sufficient to permit diodes 38 to conduct. Hence, diodes 38 in gate 35*c* block the negative input pulse from switching the device 10*c*. At the same time, the input pulse is effective to turn Off device 10*d* and turn On device 10*a* while the devices 10*b* and 10*c* do not change state but remain Off. Consequently, the conditions in gate 35*c* remain the same so that during the time interval from D to E the junctions 44 and 44*a* remain at E2 volts. At time E, the electronic commutator is in the same condition as at time A and, therefore, cycles in the same manner as previously described to step the On state from device to device of the commutator in response to input pulses applied to the common input terminal 56.

Figure 9:
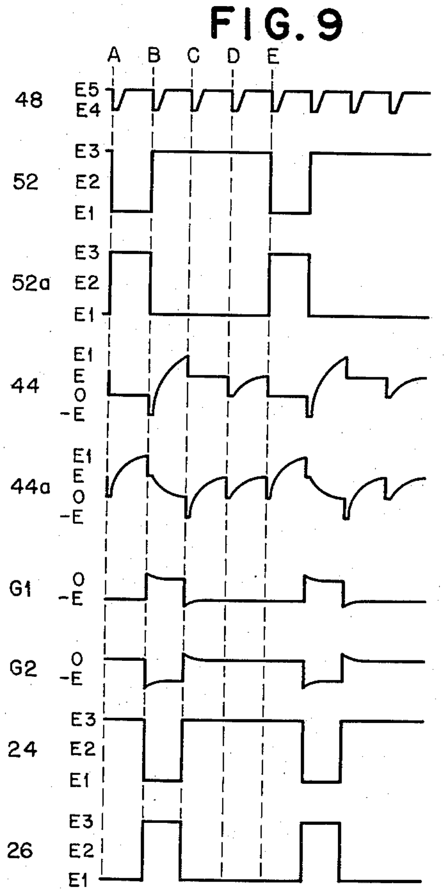
Fig. 9 is a timing diagram illustrating successive cycles of operation of one stage of the electronic commutator of the present invention employing the commutation circuit of Fig. 4.

The electronic commutator shown in Fig. 7 may also consist of a plurality of cascaded stages, each consisting of a binary commutation circuit of the type shown in Fig. 4. The operation of a typical stage of the commutator, employing the commutation circuit of Fig. 4, will now be described in conjunction with Fig. 9 which shows the waveforms at various points in stage *c* during successive cycles of operation.

Initially, as before, let it be assumed that the bi-stable device 10*a* is On while the bi-stable devices 10*b* to 10*d* are Off. Therefore, the output terminals 24 and 26 of device 10*c* are at potentials of E3 volts and E1 volts, respectively. Also, the control terminals 52 and 52*a* of gate 35*c*, being respectively connected to the output terminals 24 and 26 of device 10*b*, are at potentials of E3 volts and E1 volts, respectively. Consequently, the current through resistors 54 are such as to maintain the potentials at junctions 44 and, in effect, at the cathodes of diodes 38 at E volts.

At time A, a negative input pulse is applied to the common input terminal 56 with the resulting effect in stage *c* being that the cathodes of diodes 38 are driven down an equal amount from E volts to 0 volts. Since the potentials at the anodes of diodes 38 and 38*a* are at 0 volts and —E volts, respectively, the negative shift of potential at the cathodes from E volts to 0 volts, is not sufficient to permit diodes 38 to conduct. Hence, diodes 38 in gate 35*c* block the negative input pulse from switching the device 10*c*. At the same time, the input pulse is effective to turn Off the device 10*a* and to turn On the device 10*b* causing the potentials at the control terminals 52 and 52*a* of gate 35*c* to be switched to E1 volts and E3 volts, respectively. Now, since the potentials at the output terminal 26 and the control terminal 52 are both at E1 volts, then, during the time interval from A to B, the current through resistor 54 is such as to maintain the potential at junction 44 at 0 volts. Also, since the potentials at the output terminal 24 and the control terminal 54*a* are now both at E3 volts, then, during the time interval from A to B, the current in resistor 52*a* is such as to raise the potential at junction 44*a* exponentially toward E1 volts so that by time B the potentials at the cathodes of diodes 38 and 38*a* are at 0 volts and E1 volts, respectively.

At time B, a negative input pulse is again applied to the common input terminal 56 with the resulting effect in stage *c* being that the potentials at the cathodes of diodes 38 are again effectively driven down an equal amount, that is, the potential at junction 44 is driven from 0 volts to —E volts while the potential at junction 44*a* is driven from E1 volts to E volts. Now, since the potential at the anode of diode 38*a* is at —E volts, the negative shift of potential at the cathode of diode 38*a*, from E1 volts to E volts, is not sufficient to cause conduction therethrough and, therefore, diode 38*a* blocks the input pulse from having any effect on device 10*c*. However, since the potential at the anode of diode 38 is at 0 volts, the negative shift of potential at the cathode, from 0 volts to —E volts, causes diode 38 to conduct and effectively transfer a negative spike to initiate switching On the device 10c. Device 10c, in being turned On, effectively causes a positive voltage swing to be applied to the output terminal 26 and to the RC network in gate 36 to cause the coupling capacitor 40 to start charging. Device 10c also effectively causes a negative voltage swing to be applied to the output terminal 24 and to the RC network in gate 36a to cause the coupling capacitor 40a to start discharging. At the same time that the device 10c is turned On, the input pulse is effective to turn Off the device 10b causing the potentials at the control terminals 52 and 52a of gate 35c to be switched to E3 volts and E1 volts, respectively. Therefore, since the potentials at the output terminal 26 and the control terminal 52 are now both at E3 volts, then, during the time interval from B to C, the current in resistor 54 is such as to raise the potential at junction 44 exponentially toward E1 volts. Also, since the potentials at the output terminal 24 and control terminal 52a are now both at E1 volts, then, during the time interval from B to C, the current in resistor 54a is such as to lower the potential at junction 44a exponentially toward 0 volts so that by time C the potentials at the cathodes of diodes 38 and 38a are at E1 volts and 0 volts, respectively.

At time C, a negative input pulse is again applied to the common input terminal 56 with the resulting effect in stage c being that the potentials at the cathodes of diodes 38 are again effectively driven down an equal amount, that is, the potential at junction 44 is driven from E1 volts to E volts while the potential at junction 44a is driven from 0 volts to —E volts. Now, since the potential at the anode of diode 38 is at —E volts, the negative shift of potential at the cathode of diode 38, from E1 volts to E volts, is not sufficient to cause conduction therethrough and, therefore, diode 38 blocks the input pulse from having any effect on device 10c. However, since the potential at the anode of diode 38a is at 0 volts, the negative shift of potential at the cathode, from 0 volts to —E volts, causes diode 38a to conduct and effectively transfer a negative spike to initiate switching Off the device 10c. At the same time that device 10c is turned Off, the input pulse is effective to turn On the device 10d. Device 10c, in being turned Off, effectively causes the potentials at the output terminals 24 and 26 to be switched to E3 volts and E1 volts, respectively. Since the device 10b does not change state at time C, the potentials at the control terminals 52 and 52a of gate 35c remain at E3 volts and E1 volts, respectively. Therefore, since the potential at the output terminal 26 is at E1 volts and the potential at the control terminal 52 is at E3 volts, then, during the time interval from C to D, the current in resistor 54 is such as to maintain the potential at junction 44 at E volts. Also, since the potential at the output terminal 24 is at E3 volts and the potential at the control terminal 52a is at E1 volts, then, during the interval from C to D, the current in resistor 54 is such as to raise the potential at junction 44a exponentially toward E volts so that by time D the potentials at the cathodes of diodes 38 are at E volts.

At time D, a negative input pulse is again applied to the common input terminal 56 with the resulting effect in stage c being that the potentials at the cathodes of diodes 38 are again effectively driven down an equal amount, that is, the potentials at junctions 44 are driven from E volts to 0 volts. Now, since the potentials at the anodes of diodes 38 and 38a are at 0 volts and —E volts, respectively, the negative shift of potential at the cathodes from E volts to 0 volts, is not sufficient to permit diodes 38 to conduct. Hence, diodes 38 in gate 35c block the negative input pulse from switching the device 10c. At the same time, the input pulse is effective to turn Off device 10d and turn On device 10a while devices 10b and 10c do not change state but remain Off. Consequently, the conditions in gate 35c remain the same so that during the time interval from D to E the junctions 44 rise exponentially back toward E volts. At time E, the electronic commutator is in the same condition as at time A and, therefore, cycles in the same manner as previously described to step the On state from device to device of the commutator in response to input pulses applied to the common input terminal 56.

The following tables show by way of examples particular values for the potentials of the various batteries and for the impedances of the various resistors and capacitors which may be used in the circuits of Figs. 1 and 4. These values are set forth by way of examples only, and the invention is not limited to them nor to any of them;

*Fig. 1*

| | | |
|---|---|---|
| Resistor 16 | ohms | 10K |
| Resistor 18 | do | 10K |
| Resistors 28 | do | 18K |
| Resistors 30 | do | 24K |
| Resistors 32 | do | 15K |
| Capacitors 34 | mmf | 22 |
| Capacitors 40 | mmf | 22 |
| Resistors 42 | ohms | 100K |
| Resistors 50 | do | 68K |
| Battery ++B | volts | 200 |
| Battery +B | do | 100 |
| Battery —B | do | —100 |

*Fig. 4*

| | | |
|---|---|---|
| Resistor 16 | ohms | 10K |
| Resistor 18 | do | 10K |
| Resistors 28 | do | 12K |
| Resistors 30 | do | 16K |
| Resistors 32 | do | 22K |
| Capacitors 34 | mmf | 22 |
| Capacitors 40 | mmf | 22 |
| Resistors 42 | ohms | 100K |
| Resistors 50 | do | 100K |
| Resistors 54 | do | 130K |
| Battery ++B | volts | 200 |
| Battery +B | do | 100 |
| Battery —B | do | —100 |

While there have been shown and described and pointed out the fundamental novel features of the invention as applied to several modifications, it will be understood that various omissions and substitutions and changes in the form and details of the circuits illustrated and in their operation may be made by those skilled in the art without departing from the spirit of the invention. It is the intention, therefore, to be limited only as indicated by the scope of the following claims.

What is claimed is:

1. An electronic commutator comprising a series of similar stages each of which includes an element having two states of stability and including a pair of input leads and a pair of output leads, a gate having an input lead, a first pair of control leads, a second pair of control leads and a pair of output leads, the element of at least one stage being in one state of stability and the elements of the remaining stages being in the other state of stability, means connecting the output leads of said gate in each stage to the input leads of the associated element, means coupling the output leads of the element in each stage to the first pair of control leads of the associated gate and to the second pair of control leads of the gate in the succeeding stage for controlling said gates in accordance with the state of said element, and means for simultaneously applying a pulse to all of the input leads of said gates whereby the gate associated with the element in the one state of stability and the gate associated with the succeeding element in the other state of stability simultaneouly apply pulses to switch said associated elements to their opposite state of stability.

2. An electronic commutator comprising a series of similar stages each of which includes an element having two states of stability and including a pair of input lines and a pair of output lines, a pair of gates having a common input line, separate first control lines, separate second control lines and separate output lines, the element of at least one stage being in one state of stability and the elements of the remaining stages being in the other state of stability, means connecting the separate output lines of the gates in each stage to the input lines of the associated element, means coupling the output lines of the element in each stage to the separate first control lines of the associated gates and to the separate second control lines of the gates in the succeeding stage for controlling said gates in accordance with the state of said element, and means for simultaneously applying a signal to all of the common input lines of said gates whereby the gates associated with the element in the one state of stability and the gates associated with succeeding element in the other state of stability simultaneously apply signals to switch said associated elements to their opposite state of stability.

3. An electronic commutator comprising a series of similar stages each of which includes an element having two states of stability and including a pair of input lines and a pair of output lines, a pair of gates having a common input line, separate first control lines, separate second control lines and separate output lines, the element of at least one stage being in one state of stability and the elements of the remaining stages being in the other state of stability, means connecting the separate output lines of the gates in each stage to the input lines of the associated element, means including cathode followers coupling the output lines of the element in each stage to the separate first control lines of the associated gates and to the separate second control lines of the gates in the succeeding stage for controlling said gates in accordance with the state of said element, and means for simultaneously applying a signal to all of the common input lines of said gates whereby the gates associated with the element in the one state of stability and the gates associated with succeeding element in the other state of stability simultaneously apply signals to switch said associated elements to their opposite state of stability.

4. An electronic commutator comprising a series of similar stages each of which includes an element having two states of stability and including a pair of input lines and a pair of output lines, a pair of impedance lowering devices, a pair of gates having a common input line, separate first control lines, separate second control lines and separate output lines, the element of at least one stage being in one state of stability and the elements of the remaining stages being in the other state of stability, means connecting the separate output lines of the gates in each stage to the input lines of the associated element, means connecting the output lines of the element in each stage to said impedance lowering device, means connecting said impedance lowering devices to the separate first control lines of the associated gates, means connecting said impedance lowering devices to the separate second control lines of the gates in the succeeding stage for controlling said gates in accordance with the state of said element, and means for simultaneously applying a signal to all of the common input lines of said gates whereby the gates associated with the element in the one state of stability and the gates associated with succeeding element in the other state of stability simultaneously apply signals to switch said associated elements to their opposite state of stability.

5. An electronic commutator comprising a series of similar stages each of which includes an element having two states of stability and including a pair of input lines and a pair of output lines, a pair of gates having a common input line and each comprising a diode and capacitor serially connected between said common input line and an input line of said element, the element of at least one stage being in one state of stability and the elements of the remaining stages being in the other state of stability, means coupling the output lines of the element in each stage to the junctions of the diode and capacitor in the associated gates and to the junctions of the diode and capacitor in the gates of the succeeding stage for controlling said gates in accordance with the state of said element, and means for simultaneously applying a signal to all of the common input lines of said gates whereby the gates associated with the element in the one state of stability and the gates associated with succeeding element in the other state of stability simultaneously apply signals to switch said associated elements to their opposite state of stability.

6. An electronic commutator comprising a series of similar stages each of which includes an element having two states of stability and including a pair of input lines and a pair of output lines, a pair of cathode followers, a pair of gates having a common input line and each comprising a diode and capacitor serially connected between said common input line and an input line of said element, the element of at least one stage being in one state of stability and the elements of the remaining stages being in the other state of stability, means connecting the output lines of the element in each stage to said cathode followers, a first pair of resistors respectfully connecting said cathode followers to the junctions of the diode and capacitor in the associated gates, a second pair of resistors respectfully connecting said cathode followers to the junctions of the diode and capacitor in the gates of the succeeding stage for controlling said gates in accordance with the state of said element, and means for simultaneously applying a signal to all of the common input lines of said gates whereby the gates associated with the element in the one state of stability and the gates associated with succeeding element in the other state of stability simultaneously apply signals to switch said associated elements to their opposite state of stability.

References Cited in the file of this patent

UNITED STATES PATENTS

| | | |
|---|---|---|
| 2,535,303 | Lewis | Dec. 26, 1950 |
| 2,580,771 | Harper | Jan. 1, 1952 |
| 2,644,887 | Wolfe | July 7, 1953 |
| 2,719,228 | Auerbach et al. | Sept. 27, 1955 |